(12) United States Patent
Ernst et al.

(10) Patent No.: US 7,369,150 B2
(45) Date of Patent: May 6, 2008

(54) METHOD, SYSTEM AND PROGRAM PRODUCT FOR AMPLITUDE MODULATED MULTIPLE PEL PRINT QUALITY ENHANCEMENT

(75) Inventors: Larry Mason Ernst, Longmont, CO (US); John Charles Wilson, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 225 days.

(21) Appl. No.: 11/050,011

(22) Filed: Feb. 2, 2005

(65) Prior Publication Data

US 2006/0170758 A1    Aug. 3, 2006

(51) Int. Cl.
*B41J 2/47* (2006.01)
(52) U.S. Cl. ...................... 347/240; 347/251
(58) Field of Classification Search ............... 347/131, 347/143, 240, 251–254; 358/1.9, 3.01–3.02, 358/534–535; 382/176
See application file for complete search history.

(56) References Cited

U.S. PATENT DOCUMENTS

| 4,967,211 | A | | 10/1990 | Colby et al. |
| 5,461,411 | A | * | 10/1995 | Florence et al. ............ 347/240 |
| 5,515,480 | A | | 5/1996 | Frazier |
| 5,742,703 | A | * | 4/1998 | Lin et al. .................... 382/176 |
| 5,784,091 | A | * | 7/1998 | Ema et al. ................... 347/131 |
| 5,828,397 | A | | 10/1998 | Goto et al. |
| 5,872,897 | A | | 2/1999 | Jones et al. |
| 5,999,273 | A | | 12/1999 | Casey et al. |
| 6,061,372 | A | | 5/2000 | Plummer et al. |
| 6,147,699 | A | | 11/2000 | Berry et al. |
| 6,177,948 | B1 | | 1/2001 | Estabrooks et al. |
| 6,181,357 | B1 | | 1/2001 | Hanna |
| 6,229,555 | B1 | | 5/2001 | Hadady et al. |
| 6,356,291 | B1 | | 3/2002 | Ernst |
| 6,404,508 | B1 | | 6/2002 | Ota et al. |

OTHER PUBLICATIONS

U.S. Appl. No. 10/693,783, filed Oct. 24, 2003, Ernst et al.

* cited by examiner

*Primary Examiner*—Hai Pham

(57) ABSTRACT

Disclosed is a method, system and program product for performing multiple-pel print quality enhancement (PQE) using amplitude modulation. A determination is made of an adjusted peak amplitudes value of each pel of an image. At least two adjacent pels are then grouped together and a determination is made of a peak amplitudes value that will serve as a gray amplitude value for each pel in the pel group. Also determined is position information indicating the alignment of the peak amplitudes within the combined area. The combined peak amplitudes and position information is sent as input to an amplitude modulator operating at a speed equal to the video data rate of the printer divided by the number of pels for which the peak amplitudes data is combined.

20 Claims, 4 Drawing Sheets

TABLE 1

| Pel 402 (FIG. 4A) | Pel 404 (FIG. 4A) | Position / Alignment | Gray Power | Switch S1 (FIG. 3) | Switch S2 (FIG. 3) | Switch S3 (FIG. 3) |
|---|---|---|---|---|---|---|
| 0 (white) | 0 (white) | white - white | LUT value | OPEN | OPEN | CLOSE |
| 0 (white) | 1 (black) | white - black | LUT value | Close: pel 402 Open: pel 404 | OPEN | Open: pel 402 Close: pel 404 |
| 1 (black) | 0 (white) | black - white | LUT value | Open: pel 402 Close: pel 404 | OPEN | Close: pel 402 Open: pel 404 |
| 1 (black) | 1 (black) | black-black [1]* | LUT value | OPEN | OPEN | CLOSE |
| 1 (black) | 1 (black) | black-black [2]* | LUT value | OPEN | Open: pel 402 Close: pel 404 | Close: pel 402 Open: pel 404 |
| 1 (black) | 1 (black) | black-black [3]* | LUT value | OPEN | Close: pel 402 Open: pel 404 | Open: pel 402 Close: pel 404 |

*black-black [1]:
   A. the pel left of pel 402 is black and the pel right of pel 404 is black
   B. the pel left of pel 402 is white and the pel right of pel 404 is white
black-black [2]:
   the pel left of pel 402 is white and the pel right of pel 404 is black
black-black [3]:
   the pel left of pel 402 is black and the pel right of pel 4040 is white

FIG. 5

METHOD, SYSTEM AND PROGRAM PRODUCT FOR AMPLITUDE MODULATED MULTIPLE PEL PRINT QUALITY ENHANCEMENT

CROSS-REFERENCE TO RELATED APPLICATIONS

This application is related to the following co-pending and commonly-assigned U.S. patent applications, all of which are incorporated herein by reference in their entirety:

"Method, System, and Program for Reducing Toner Usage in Print Output", Ser. No. 09/535,859, filed Feb. 27, 2000 (hereinafter referred to as the '859 Application); and "Method, System, and Program for Producing a Look-up Table to Enhance Print Quality", Ser. No. 09/535,857 filed Feb. 27, 2000 (hereinafter referred to as the '857 Application).

"Method, System and Program Product for Multiple Pel Print Quality Enhancement", Ser. No. 10/693,783, filed Oct. 24, 2003 (hereinafter referred to as the '783 Application).

BACKGROUND OF THE INVENTION

To print an image, a print engine processor, referred to herein as a raster image processor, converts the image in a page description language or vector graphics format to a bit mapped image indicating a value to print at each picture element (pixel or pel) of the image. (Note that the terms "pixel" and "pel" are used throughout this specification in an interchangeable manner. Each term refers to one dot or one point of data in the complete image).

Each bit representing a pel that is "on" is converted to an electronic pulse. The printer includes a rotating drum comprised of a photo-conducting surface with a coating capable of holding an electrostatic charge. In one implementation, the drum surface is initially negatively charged. The electronic pulses generated from the raster data control a laser beam that positively charges selected areas on the surface of the drum. In this manner, the pulsing of the laser beam creates an electrostatic representation of the image on the drum surface. Typically, the laser operates on one "scan line" at a time where a scan line is a set of pels representing one line of the image. After the laser beam charges all active pels from one scan line of the raster data, the drum rotates so the laser beam can operate on the next scan line.

The drum surface, including the positively charged electrostatic representation of the image, then passes over negatively charged toner. The negatively charged toner is attracted to the positively charged areas of the drum that form the image. The paper, which is even more negatively charged that the drum, passes over the drum and attracts the toner, thereby transferring the image from the drum to the paper. The toner is then fused to the paper using a pair of heated rollers.

The above discussion describes the drum, the toner, the paper, and other components as having certain charges enabling the formation of the image on the paper. Analogous printing systems, well known to those skilled in the art, utilize functionally similar components that operate using opposite charges, but provide the same end result.

Many modern laser printers filter the bit map images using a look-up table to alter the pulses generated for each pel to accomplish certain filtering results. For instance, filters can be used to provide an economy mode where toner is reduced, remove jagged edges, improve image quality, improve print quality using known techniques referred to as 'Print Quality Enhancement' (PQE) or reduce the density of images. The subject matter of the present invention is primarily concerned with filtering for PQE purposes, but is applicable to filtering generally.

Typically, a laser printer will analyze a contiguous area of pel data and modify the laser output intensity values for one or more of the pels in the area. For example, a laser printer may compare the pel pattern in an area to one or more predefined patterns stored in a look-up table. If a match is detected between the pel pattern and a pattern in the lookup table, the printer may modify the laser output intensity normally used for an "on" pel. The printer might, for example, use a pulse width modulator to shorten the pulse width to reduce the electric charge the laser beam places on the drum or an amplitude modulator to reduce the peak amplitude of the pulse to reduce the electric charge the laser beam places on the drum. (The present invention is primarily concerned with the use of an amplitude modulator to control the electric charge). For instance, if the amplitude modulator reduces the amplitude associated with a particular pel to one-half of the peak amplitude, the laser will discharge the photoconductor in the area of the drum surface corresponding to the pel with only one-half of the available power. The reduction in laser power causes a corresponding reduction in the amount of discharge on the drum surface that, in turn, causes a change in the amount of toner that is ultimately transferred to the paper. The look up tables used by the amplitude modulator to filter pel data vary the pulse amplitude to attain PQE are well known to those skilled in the relevant arts. Pels printed using less than the full amplitude for PQE purposes may be referred to as "gray-scale" pels as they are printed somewhere between white and black. Techniques other than look-up tables may also be utilized for PQE purposes as long as such techniques provide for the modification of amplitude values in response to recognition of certain patterns of pel data.

A system utilizing amplitude modulation for PQE purposes must feed an amplitude modulator with information indicating the peak amplitude of the pulse to create for each pixel. This means that the amplitude modulator must be able to accept and process the input and create and deliver the required pulse at the proper amplitude to the laser within the time it takes the printer to print one pel. As modern, high-function printers continue to operate at faster and faster speeds, it becomes more difficult for the amplitude modulator to keep pace. The latest printers are capable of operating at speeds of 100 MHz or greater, which leads to a "Pel Time", or the time needed by the printer to process one pixel, of 10 ns or less. Another way to measure the speed of a printer is called the "Video Data Rate", which is the number of pels written on the drum by the printhead per second. As printer speeds continue to increase, it is becoming more and more difficult for amplitude modulators to function properly. Increases in speed are more difficult to achieve in the amplitude modulators because some minimum time is required to reset the amplitude modulator after each pulse.

For the above reasons, there is a need in the art for an improved technique for processing pels of print output for PQE in order to allow amplitude modulators to keep up with the increasing printer speeds without reducing print image quality.

SUMMARY OF THE INVENTION

To overcome the limitations in the prior art described above, preferred embodiments disclose a method, system, and program product for performing multiple-pel PQE based on amplitude modulation. When operating according to the present invention, the pels surrounding each subject pel are identified. For each subject pel, an amplitude value is generated based on a pattern of the surrounding pels of the subject pel. Two or more adjacent subject pels are then grouped together and a combined amplitude peak power is determined for a pulse covering the combined region of the grouped pels. Further, position information is calculated to align the combined amplitude peak power within the combined region. The combined amplitude peak power and position information is then fed to an amplitude modulator. The amplitude modulator creates a pulse corresponding to the input combined amplitude peak power and position information as if it were for a single pel. In accordance with the present invention, when grouping two pels at a time, the amplitude modulator is operated at one-half the Video Data Rate of the printer. Because the amplitude modulator is operating at one-half the Video Data Rate of the printer, the output pulse effectively charges the drum for two pels of data. As such, a printer according to the present invention can implement PQE using amplitude modulation at up to twice the speed of available amplitude modulators.

In other embodiments of the present invention, three or more pels may be grouped together before sending the combined amplitude peak and position information to the amplitude modulator. In such embodiments, the amplitude modulator speed would be the printer Video Data Rate divided by the number of pels grouped together. For instance, when operating on three pels at a time, the amplitude modulator speed would be one-third the printer Video Data Rate.

Further in accordance with the present invention, the combined amplitude peak power and position information may be encoded in one or more look-up tables that provide one output combined amplitude peak power and position for an input pair of amplitude and positional values. Alternatively, other known methods may be employed for pre-calculating and accessing the combined amplitude peak power and position information. Depending on the processing speed and bandwidth available, it may also be possible to calculate the combined amplitude peak power and position information 'on the fly' based on known PQE techniques and algorithms.

Preferred embodiments provide a technique for amplitude modulation to allow printer speeds that exceed the speeds of the provided amplitude modulators. The present invention allows increased speeds by feeding the amplitude modulator combined amplitude peak power and position information for two or more pels at a time. When the amplitude modulator, operating at a speed equal to the printer Video Data Rate divided by the number of pels combined in the input data, produces the indicated pulse at the proper position, the pulse effectively covers the number of pels combined in the data in a single pulse.

BRIEF DESCRIPTION OF THE DRAWINGS

Some of the purposes of the invention having been stated, others will appear as the description proceeds, when taken in conjunction with the accompanying drawing, in which:

FIG. 5 is a table illustrating the amplitude modulation behavior of a printing system according to an embodiment of the invention.

DETAILED DESCRIPTION OF THE INVENTION

While the present invention will be described more fully hereinafter with reference to the accompanying drawings, in which the preferred embodiments of the present invention are shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
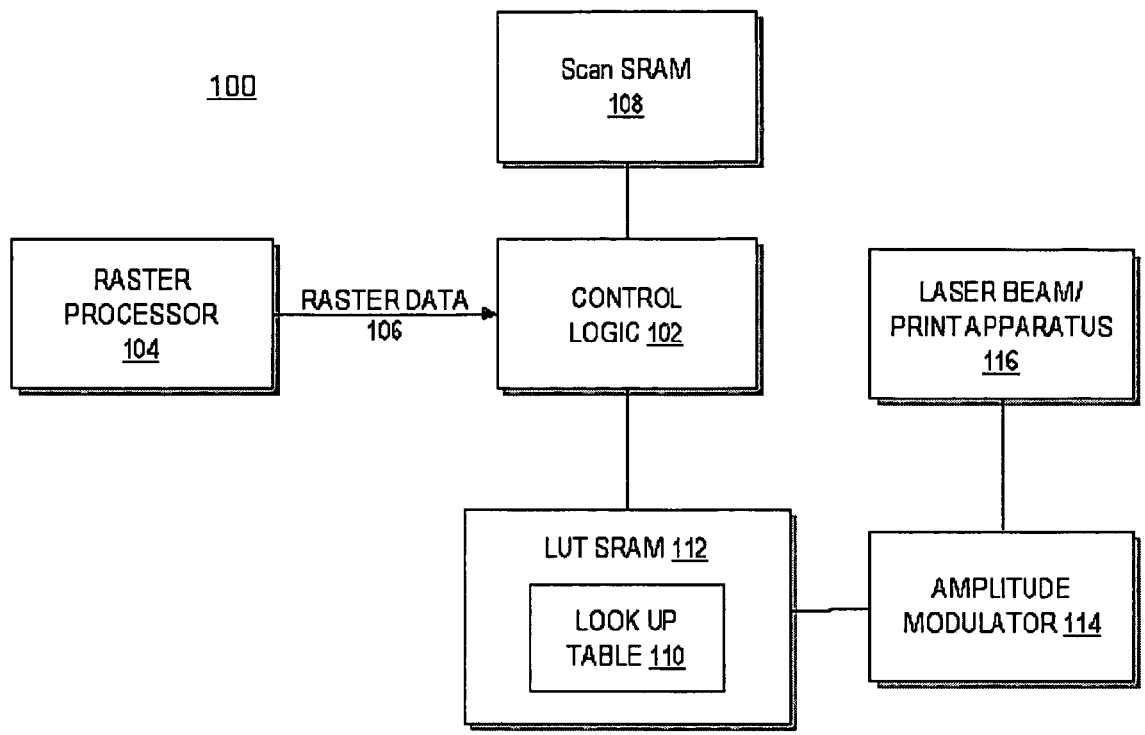
FIG. 1 illustrates a printing/computing environment in which known embodiments of print quality enhancement may be implemented.

FIG. 1 illustrates a computing/printing environment 100 in which embodiments of the present invention may be implemented. Control logic 102 comprises a central processing unit (CPU), a programmable chip, such as a field programmable gate array (FPGA), or other type of multi-purpose or specialized microprocessor, which includes logic to perform the described pel filtering operations. The raster processor 104 generates raster data from vector graphics or page description language commands. The raster data 106 comprises scan lines of pels, where each pel has an 'on' or 'off' value and location information for the pel in the scan line. Control logic 102 accesses scan lines of raster data 106 and may transfer the pels to a scan static random access memory (SRAM) 108. Control logic 102 may alternatively transfer the scan lines of raster data 106 to any type of locally accessible memory for later processing, as such techniques are well known in the art.

Control logic 102 accesses the pel data from the SRAM 108 (or other storage, not shown) and uses at least one look-up table 110 which was previously calculated and stored in local storage 112 to determine an adjusted output value for each input pel value. Look-up table 110 may be used to accomplish any one of several types of pel filtering operations, such as print quality enhancement, toner reduction, etc. The present invention is most concerned with print quality enhancement.

Look-up table 110 specifies how to modify a pel based on the values of the surrounding pels. A pel is modified by adjusting its peak amplitude. The peak amplitude data for a pel is transferred to the amplitude modulator 114 to generate an electronic pulse that controls the laser 116 to electrically charge the area of the drum corresponding to the pel as part of the printing process. Such amplitude data may also be obtained from look-up table 110. Alternatively, the adjusted output value for each pel may be obtained by using any other known pre-calculation and access method, or may be calculated 'on-the-fly', assuming adequate processing speed and bandwidth is available in control logic 102.

A more detailed discussion of these known techniques for performing print quality enhancement and other pel adjustments is contained in the '859 Application. The '857 Application provides methodologies for creating look-up table 110 and is also incorporated herein by reference it its entirety.

Figure 2:
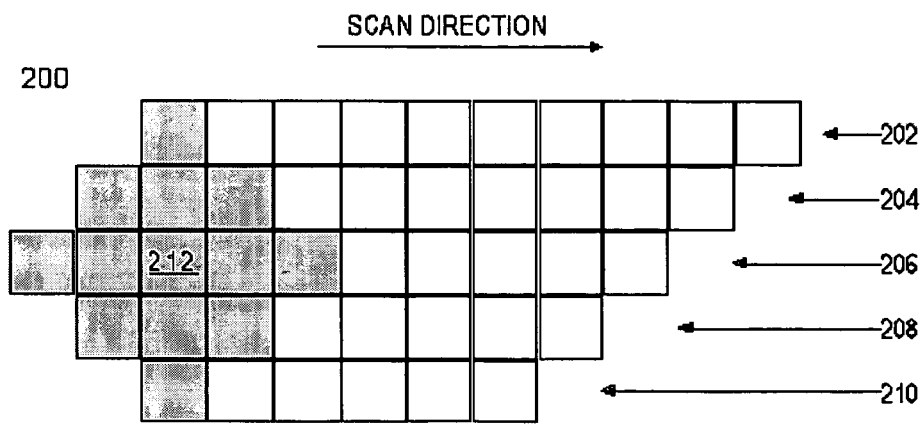
FIG. 2 illustrates a window of pel data accessed for filtering operations in accordance with known PQE techniques and with embodiments of the present invention.

FIG. 2 illustrates how scan line raster data is accessed and processed by control logic 102. In FIG. 2, each block represents a pel, a white block represents buffered pel data and a darkened block represents one pel in a window 200 of pels that control logic 102 is considering during the filtering operation. In the illustrated embodiment, control logic 102 accesses a diamond-shaped group of pels 200 from five different scan lines 202, 204, 206, 208, 210 which enclose an interior pel 212. In a typical embodiment, one or more of the at least one look-up table 110 includes an output value for each unique combination of values for the pels in window 200. The output value provides an adjusted pulse amplitude for interior pel 212 in window 200. If the number of pels included in window 200 is N, there are $2^N$ possible patterns of pels. Some embodiments reduce the number of output values necessary for the various patterns by combining the possible patterns into some number of pattern categories where the patterns within each category share some common characteristics that result in the same adjustment of a pel within such a pattern. In such embodiments, look-up table(s) 110 need only provide an output value for each category of pattern instead of each individual pattern. The techniques illustrated in FIG. 2 and discussed above are known in the art of print quality enhancement and are discussed in further detail in the '859 patent application.

The purpose of window 200 is to provide an adjusted amplitude for interior pel 212 based on the surrounding pels that have the most affect on interior pel 212. As illustrated in FIG. 2, window 200 is shaped as a diamond to approximate the circular shape of a charge the laser creates on the drum and the shape in which toner is applied to a pel. Alternatively, window 200 of surrounding pels considered in modifying the amplitude of a center pel 212 may be shaped as a square, a rectangle or any other shape considered advantageous for a given application.

Figure 3:
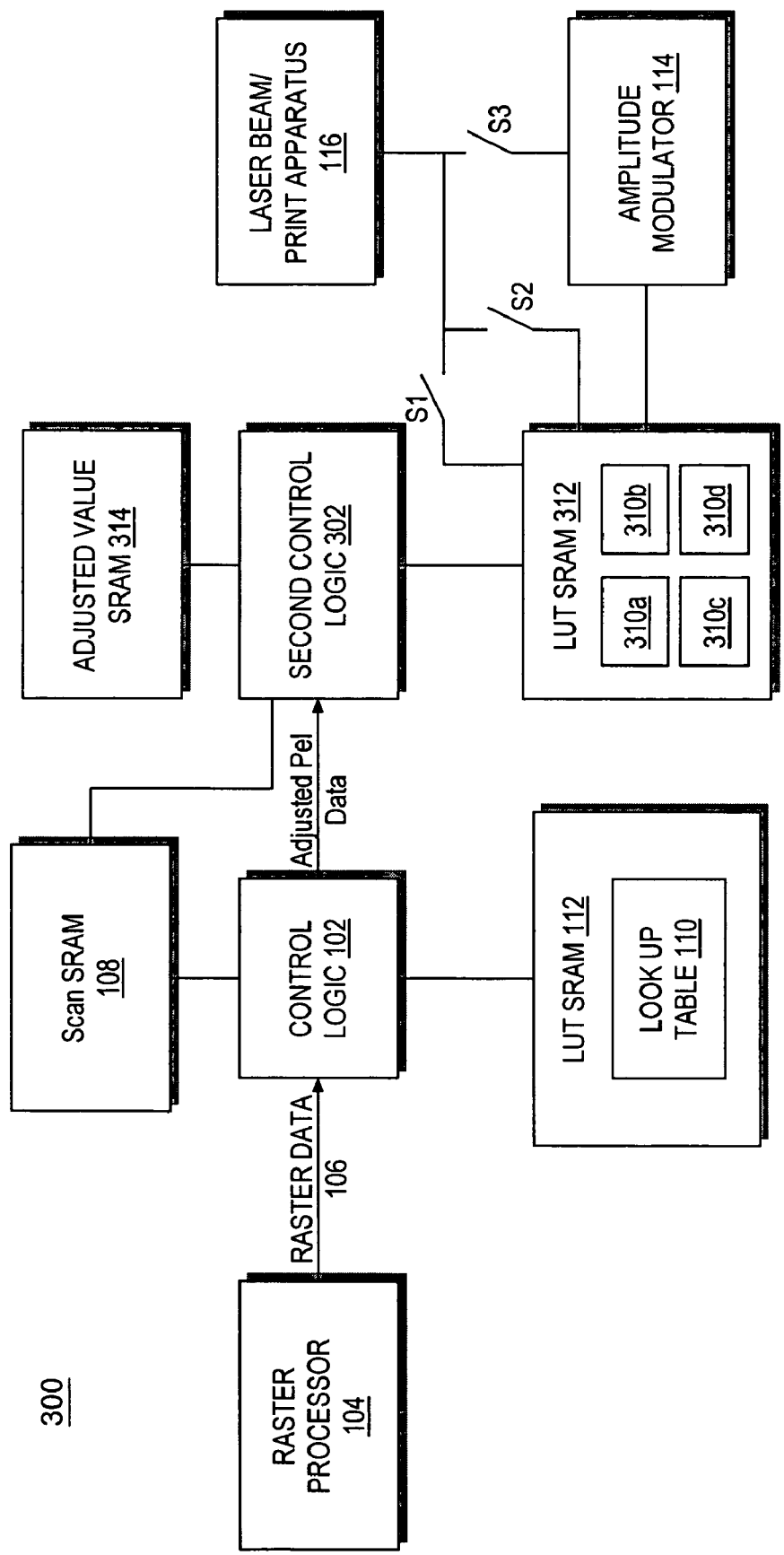
FIG. 3 illustrates a printing/computing environment in which embodiments of the present invention are implemented.

In processing the pels in a given bitmap, control logic 102 reads the pels in window 200 by reading the scan lines 202, 204, 206, 208, 210 one at a time. Window 200 shifts to the right through the scan lines. After processing all pels in a scan line as an interior pel 212, window 200 shifts down to start including subsequent scan lines in window 200. In this manner, every pel in the bitmap is, at one point, processed as an interior pel 212 and is adjusted based on the values of the surrounding pels in window 200. Preferably, only the original pel values are used for surrounding pels in adjusting the pel value for center pels 212. That is, after an interior pel 212 is adjusted, when that previous center pel becomes a surrounding pel around another center pel 212 in window 200, the original value of that interior pel is used rather than the adjusted pulse amplitude value. The above print quality enhancement techniques are described in more detail in the co-pending patent applications mentioned and incorporated above and are applicable to the present invention as the first step of a method of multiple pel print quality enhancement. FIG. 3 illustrates the computing/printing environment 100 of FIG. 1 modified as shown to create computing/printing environment 300 to perform the multiple pel print quality enhancement of the present invention. For the sake of clarity, elements appearing unchanged from FIG. 1 retain like element numbers. In the preferred embodiment, after control logic 102 processes the raster data 106 as discussed above to create an adjusted amplitude value for each processed pel, second control logic 302 examines the adjusted amplitude value for two adjacent pels. Using the adjusted amplitude value for the two adjacent pels and the pre-calculated, pre-stored look-up tables 310a, 310b, 310c and 310d which are located in an accessible storage area such as SRAM 312, second control logic 302 calculates a combined pulse amplitude value and alignment data for the combined area of the two adjacent pels. In some embodiments, second control logic 302 may store the adjusted pel value data in an accessible local or remote storage area 314 prior to processing. Also, some embodiments may have second control logic 302 access the scan SRAM 108 for the original pel data in calculating the combined pulse amplitude value and alignment data.

As readily recognized by those skilled in the art, the exact order of the process steps described above may be varied in any advantageous manner without deviating from the present invention. For example, some embodiments of the present invention may perform all the calculations of adjusted amplitude values for the individual pels of an image first, storing the results. This embodiment would contemplate then going back and selecting the adjacent pels (two, three, or more at a time) for the performance of the combination calculations which are key to the present invention. On the other hand, alternate embodiments might perform the combined amplitude and position information calculations on each pair (or other sized group) of pels as the individual calculations are completed.

The embodiment of the present invention shown in FIG. 3 uses four look-up tables 310a, 310b, 310c, and 310d to calculate the combined pulse amplitude value for the two adjacent pels based on their own adjusted pulse amplitude values and the pattern of surrounding pels. A set of four look-up tables may be advantageously employed, one look-up table corresponding to each of the four possible 2-bit pel patterns (i.e., white-white, white-black, black-white, and black-black). Those skilled in the relevant arts will recognize that alternate embodiments may use a different number of look-up tables or may use an alternate method of pre-calculating the combined amplitude values for the possible combinations of adjusted amplitude values and surrounding pel patterns. Alternatively, given sufficient processing speed and bandwidth, the combined amplitude values may be calculated 'on-the-fly' by second control logic 302.

FIG. 3 shows control logic 102 and second control logic 302 as separate components solely for ease of illustration. Persons skilled in the art will readily recognize that the functions performed by these two components may be implemented in a single chip or other component capable of performing the described processes. Similarly, SRAMs 108 and 314 and SRAMS 112 and 312 are shown as separate components for clarity is describing the functions performed. These storage areas may comprise other types of electronic or magnetic storage, either local or remote, and may, in fact, comprise separate, identifiable portions of the same storage area.

As depicted in FIG. 3, system 300 includes three analog switches S1, S2, and S3. S1 and S2 serve as switches for pels that are completely white and completely black respectively. S1 connects an amplitude value corresponding to full white to printer apparatus 116, S2 connects an amplitude value corresponding to full black to printer apparatus 116, and S3 connects the amplitude value produced by amplitude modulator 114 to the printer apparatus. System 300 uses the three switches to take one of three possible actions on each pel: (1) generate an amplitude value corresponding to complete white, (2) generate an amplitude value corresponding to complete black; or (3) generate an amplitude value that is modified from complete black (i.e. using the amplitude value produced by amplitude modulator 114). The amplitude produced by amplitude modulator 114 is determined by a pair of largely independent considerations. First, the amplitude for an "on" pel is modified for PQE based upon the pattern of pels in which the subject pel is located (as described above with respect to FIG. 2). Second, this PQE adjusted amplitude value is then adjusted again to reflect the 2-pel amplitude modulator and to produce a modulated amplitude value that is valid for two pels.

Referring to FIG. 5, a table (Table 1) is presented to illustrate an implementation of a multiple pel, amplitude modulated PQE function for a printer apparatus according to the present invention. Table 1 includes six rows reflecting six different categories of 2-pel patterns (the number of 2-pel patterns is greater than four because consideration is given to pels adjacent to the 2-pels of interest). In the depicted implementation, the amplitude for an "on" pel will be either the fully black amplitude or a gray amplitude produced by amplitude modulator 114. More specifically, an "on" pel will receive a gray amplitude if either of its neighboring pels is "off" (white). An "on" pel will generally receive a fully black amplitude if both of its neighboring pels are "on." Table 1 includes one exception to these rules. In the case of a black-black pel pair located in a field of black pels (a black pel to the left and to the right of the pel pair), both pels in the pel pair will receive a gray amplitude value by closing S3.

Producing white, black, or gray amplitudes for each pel is controlled via switches S1, S2, and S3. A white amplitude can be produced with either the S1 switch or the S3 switch (assuming that amplitude modulator 114 does not produce a gray amplitude for a white pel. A fully black amplitude is generated by closing S2 while a gray amplitude is generated by closing S3. In this embodiment, only one of the switches is closed at any time. Table 1 enumerates scenarios of pel arrangements and which of the switches are closed for each pel in a theoretical 2-pel pair (e.g. pels 402 and 404 from FIG. 4A, etc.). Notice that for white pels, the implementation is indifferent between using S1 or S3 to produce the white amplitude value.

When operating in accordance with the present invention, the printer is operated at a video data rate of twice the operating speed of the amplitude modulator 114. Switches $S_1$, $S_2$, and $S_3$ operate up to the same speed as the video data rate. As such, when the combined pulse amplitude data and alignment information is used by the amplitude modulator 114, switches $S_1$, $S_2$, and $S_3$ to create the pulse amplitude and positional (alignment) information for the laser 116, two pels of data of the bitmap are effectively charged by the laser 116, as adjusted by the PQE process described herein. The process of the present invention is equally applicable to groups of pels greater than two. If adjusted pel data is to be created for three adjacent pels, for example, the video data rate of the printer would be three times the speed of the amplitude modulator so that the peak amplitude and alignment data output to the amplitude modulator would create a laser beam output covering an effective area of three pels. In this way, a printer may operate at a speed which is a multiple of the speed of an available amplitude modulator and still perform effective print quality enhancement.

Figure 4A:
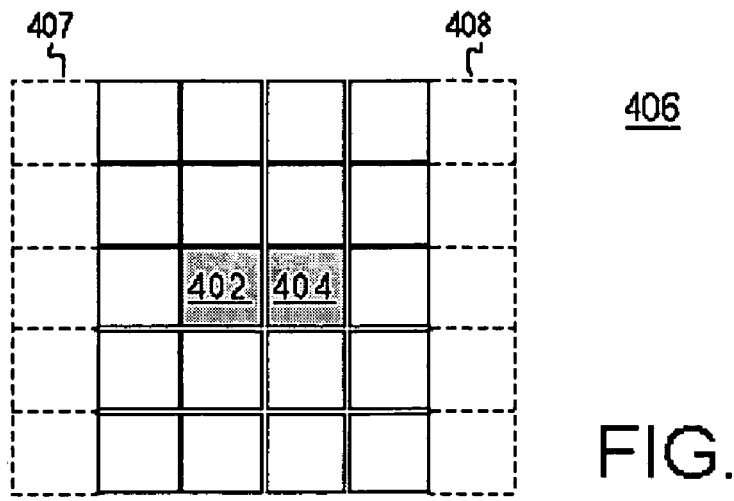
FIG. 4A illustrates a simple example of two pels which are to have their peak amplitude values adjusted in accordance with embodiments of the present invention.
Figure 4B:
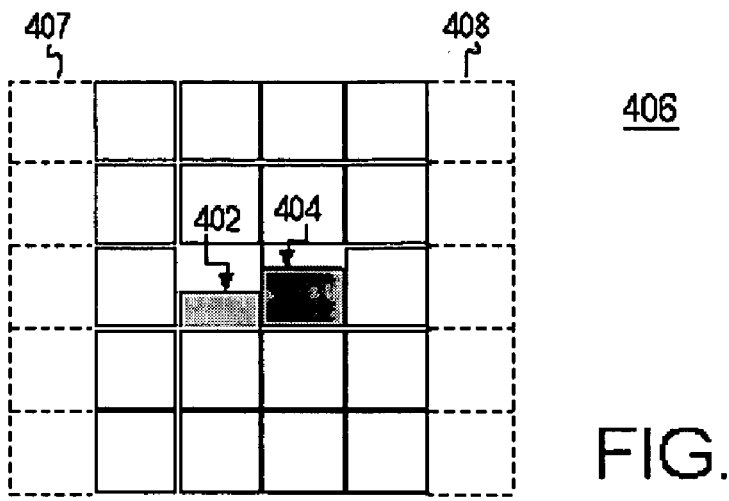
FIG. 4B illustrates the adjusted peak amplitude values for the two pels in the example of FIG. 4A.
Figure 4C:
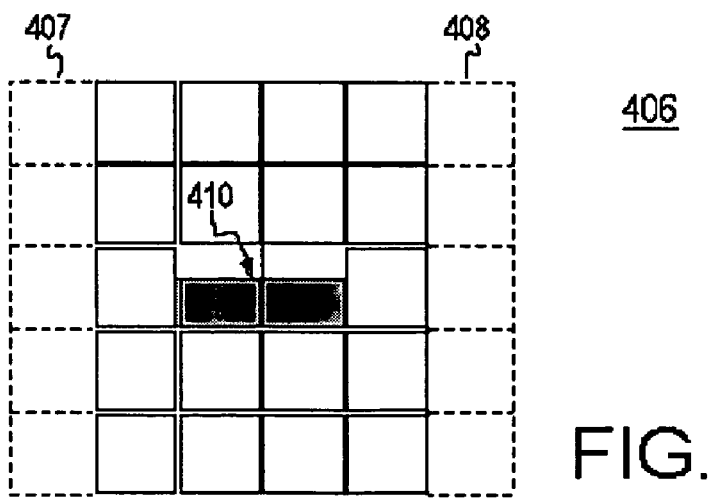
FIG. 4C illustrates the adjusted combined peak amplitude value for the two pels in the example of FIG. 4A in accordance with embodiments of the present invention.

FIGS. 4A, 4B and 4C illustrate an extremely simple example of the results of the present invention operating on two adjacent pels for one of the six distinct positional information patterns outlined in Table 1. In FIG. 4A, two pels 402, 404 are shown prior to any PQE adjustment. Pels 402 and 404 appear as shaded to indicate that they are 'on' (or black). Pels 402 and 404 are shown within a window of pels 406 which are being considered by the control logic of the present invention in adjusting the pulse width values for PQE purposes. The window 406 is shown here as being a rectangular shape but could also be a diamond shape or any other shape considered advantageous for a given application. The first step of PQE adjustment would be performed as described above on each pel 402, 404. For pel 402, the window 406 would include the column of pels 407. For pel 404, the window 406 would include the column of pels 408. After the first step of PQE is performed by control logic 102, the peak amplitude data for pels 402 and 406 may appear as shown in FIG. 4B. Adjusted peak amplitude and alignment data has been created for each pel via the look-up tables described above or some other method of calculation. This adjustment has been made according to some known PQE algorithm which is not essential to the present invention. As shown, the pulse amplitude value for pel 402 has been adjusted to approximately 40% of a full-peak value. The peak amplitude value for pel 404 has been adjusted to approximately 60% of a full-width value. If a PQE system were operating according to the state of the prior art, in order to print these two pels, two separate outputs from the amplitude modulator would be required. The amplitude modulator would be required to process the first output to print pel 402, reset itself, and process the second output to print pel 404. As discussed above, the speed of the available amplitude modulators is such that the amplitude modulator processing limits the speed of the printer.

When operating in accordance with the present invention, a second step of PQE is performed to combine the adjusted peak amplitude value of the two pels 402, 404 into an adjusted peak amplitude value for the combined area of the two pels 410. As shown in FIG. 4C, the combined peak amplitude value (shaded) for the combined pel area 410 is a peak amplitude of approximately 50% with a black-black case 1 alignment (see Table 1). When this data is output to an amplitude modulator operating at a speed equal to one-half of the video data rate of the printer, the resulting output covers the area for two pels of data and appears as shown in FIG. 4C. This example illustrates a direct translation of the peak amplitude of the two pels to a combined peak amplitude but the second step of PQE combining pel data for adjacent pels may make further adjustments in peak amplitude values as deemed advantageous by the relevant PQE algorithm.

In the drawings and specification there has been set forth a preferred embodiment of the invention, and, although specific terms are used, the description thus given uses terminology in a generic and descriptive sense only and not for purposes of limitation.

What is claimed is:

1. A method of printing an image using a printer, comprising:

for each subject pel of the image, determining a pulse amplitude value based on a pattern of surrounding pels;

using said pulse amplitude values from a pel region comprising a selected number of at least two adjacent subject pels to calculate a gray pulse amplitude applicable to each of the selected number of adjacent subject pels; and using the gray pulse amplitude to generate an output pulse amplitude applicable to each pel in the pel region;

periodically configuring a pulse generator to produce a gray pulse having the gray pulse amplitude;

processing the pels in the pel region at a first data rate, wherein processing a pel includes:
  selecting a pulse from a set of pulses wherein the set of pulses includes the gray pulse; and
  generating the selected pulse as an output pulse;
wherein a frequency of said periodically configuring equals said first data rate divided by the selected number adjacent pels in the pel region.

2. The method of claim 1 wherein toner is attracted to a charged region corresponding to the pels in the pel region causing a portion of the image represented by the at least two adjacent subject pels to be printed as determined by the gray pulse amplitude.

3. The method of claim 1 wherein the surrounding pels of a subject pel form a rectangular grid with said subject pel at the center or near center.

4. The method of claim 1 wherein the surrounding pels of a subject pel form a diamond shaped grid with said subject pel at the center or near center.

5. The method of claim 1 wherein the determining of a pulse amplitude value for a subject pel comprises assigning a pre-defined pulse amplitude value corresponding to a pattern category into which the pattern of surrounding pels falls.

6. The method of claim 1, wherein using the gray pulse amplitude to generate a pulse amplitude includes using position information to determine whether a pulse amplitude for a pel is a fully black amplitude, a fully white amplitude, or the gray pulse amplitude.

7. The method of claim 6, wherein the pulse amplitude determined for a pel is the gray pulse amplitude if the pel is an "on" pel and either of its adjacent pels is an "off" pel.

8. The method of claim 1, wherein the set of pulses consists of a white pulse having an amplitude suitable to produce an all-white pel, a black pulse having an amplitude suitable to produce an all-black pel, and the gray pulse.

9. A computer program product comprising computer executable instructions, stored on a computer readable medium, for printing an image with a printer, the instructions comprising instructions for:
  modifying a first pulse amplitude value for a first subject pel based on a pattern of first surrounding pels;
  modifying a second pulse amplitude value for a second subject pel based on a pattern of second surrounding pels, wherein the first and second subject pels are adjacent; and
  using said modified first and second pulse amplitude values to calculate a combined amplitude value;
  periodically providing an amplitude modulator with the combined amplitude value to enable the modulator to generate an output pulse, valid for the first pel as well as the second pet, the output pulse having an amplitude equal to the combined amplitude value, wherein a frequency of said periodic providing is half of a video data rate of the printer.

10. The computer program product of claim 9, wherein the surrounding pels of a subject pel form a rectangular grid with said subject pel at the center or near center.

11. The computer program product of claim 9, wherein the surrounding pels of a subject pel form a diamond shaped grid with said subject pel at the center or near center.

12. The computer program product of claim 9, wherein the instructions for determining of a pulse amplitude value for a subject pel comprise instructions for assigning a pre-defined pulse amplitude value corresponding to a pattern category into which the pattern of surrounding pels falls.

13. The computer program product of claim 9, wherein the instructions for determining a pulse amplitude value for a subject pel comprise instructions for assigning a pre-defined pulse amplitude value corresponding to the pre-defined pattern category into which the pattern of surrounding pels falls.

14. The computer program product of claim 9, further comprising instructions for using position information to determine whether a pulse amplitude for a pel is a fully black amplitude, a fully white amplitude, or the combined pulse amplitude.

15. The computer program product of claim 14, wherein the pulse amplitude determined for a pel is the combined pulse amplitude if the pel is an "on" pel and either of its adjacent pels is an "off" pel.

16. A printer system, comprising:
  a raster processor for processing page description or vector graphics information of an image into pel data;
  first control logic for processing each pel of the image, the processing comprising;
    identifying a window of pels surrounding a subject pel;
    determining an adjusted pulse amplitude value for the subject pel based on a pattern of said surrounding pels;
  second control logic for processing at least two adjacent pels, the processing comprising using the adjusted pulse amplitude value of each of the at least two adjacent pels to:
    calculate a combined complex amplitude peak power pulse to charge a region of a combined region of said at least two adjacent pels; and
    determine position information indicating an alignment of said region within the combined region of said at least two adjacent pels; and
  an amplitude modulator for processing input pulse amplitude and alignment information to create an output pulse to control a laser in charging an area of a rotating drum of a printer, wherein the pulse amplitude modulator produces said output pulses at a rate equal to a video data rate of the printer divided by the number of adjacent pels processed at a time by the second control logic wherein the second control logic delivers the combined complex amplitude peak pulse and alignment information to the pulse amplitude modulator.

17. The system of claim 16, wherein said at least two adjacent pels consist of two adjacent pels.

18. The system of claim 16, wherein said at least two adjacent pels consist of three adjacent pels.

19. The system of claim 16, wherein the determining of an adjusted pulse amplitude value for a subject pel comprises assigning a pre-defined pulse amplitude value corresponding to a predefined pattern category into which the pattern of surrounding pels falls.

20. The system of claim 19, further comprising a storage medium accessible to said first control logic and said second control logic and having stored therein at least one look up table encoding the combined pulse and position information to provide one set of combined pulse and position information for an input of:
  said pulse amplitude value for each of said at least two adjacent pels; and
  wherein said steps of calculating the combined pulse and determining position information comprise retrieving said combined pulse and position information from said at least one look up table.

* * * * *

UNITED STATES PATENT AND TRADEMARK OFFICE
CERTIFICATE OF CORRECTION

PATENT NO. : 7,369,150 B2  
APPLICATION NO. : 11/050011  
DATED : May 6, 2008  
INVENTOR(S) : Ernst et al.

It is certified that error appears in the above-identified patent and that said Letters Patent is hereby corrected as shown below:

At column 9, line 53, please correct "pet" to read --pel--.

Signed and Sealed this

Fifteenth Day of July, 2008

JON W. DUDAS
*Director of the United States Patent and Trademark Office*